(12) United States Patent
Agafonov et al.

(10) Patent No.: US 6,231,748 B1
(45) Date of Patent: May 15, 2001

(54) METHOD OF AND ARRANGEMENT FOR ELECTROCHEMICAL MACHINING

(75) Inventors: Igor L. Agafonov; Rinat A. Alimbekov; Aleksandr L. Belogorskij; Nasich Z. Gimaev; Aleksandr N. Zajcev; Viktor N. Kucenko; Rafail R. Muchutdinov, all of Ufa (RU)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/286,035

(22) Filed: Apr. 5, 1999

(30) Foreign Application Priority Data

Apr. 6, 1998 (EP) ................................. 98201080

(51) Int. Cl.$^7$ ............................. B23H 3/02; C25D 17/00; C25B 15/00
(52) U.S. Cl. ......................... 205/645; 205/659; 205/654; 204/224 M; 204/225; 204/229.5; 204/229.6; 204/229.8; 204/230.6; 204/DIG. 9
(58) Field of Search ................................. 205/659, 645, 205/654; 204/224 M, 225, 230.2, 229.8, DIG. 9, 229.5, 229.6, 230.6

(56) References Cited

U.S. PATENT DOCUMENTS 3,616,346 * 10/1971 Inoue .................................. 205/642
5,833,835 * 11/1998 Gimaev et al. .................. 205/652 X

FOREIGN PATENT DOCUMENTS

97/03781    2/1997    (WO) .

* cited by examiner

Primary Examiner—Donald R. Valentine
(74) Attorney, Agent, or Firm—Ernestine C. Bartley; Bernard Franzblau (57) ABSTRACT

A method of electrochemically machining an electrically conductive workpiece in an electrolyte by applying electrical pulses between the workpiece and an electrically conductive electrode, one or more machining pulses alternating with passivation voltage pulses for depositing passivation layers on the workpiece. The amplitude of the passivation voltage pulses is adjusted during an adjustment procedure in which the amplitude of the passivation voltage pulses is increased gradually from zero to the voltage at which the workpiece starts to dissolve in the electrolyte. After each voltage increase the resistance of the gap between the electrode and the workpiece is measured. The voltage value for the highest gap resistance is stored in a memory and used during further machining. The time span of the passivation voltage pulses may be divided into time slices and for each time slice the voltage is adjusted for maximum gap resistance during that time slice.

26 Claims, 9 Drawing Sheets

METHOD OF AND ARRANGEMENT FOR ELECTROCHEMICAL MACHINING

BACKGROUND OF THE INVENTION

This invention relates to a method, an arrangement and a power supply for a process of electrochemically machining an electrically conductive workpiece by applying electrical machining pulses between the workpiece and an electrically conductive electrode while electrolyte is supplied between the workpiece and the electrode.

Electrochemical machining is a process in which an electrically conductive workpiece is dissolved at the location of an electrode while electrolyte and electric current is supplied. For this purpose, the electrode is brought into the proximity of the workpiece and, while electrolyte is fed into the gap between the workpiece and the electrode a powerful current is passed through the workpiece and the electrode via the electrolyte, the workpiece being positive with respect to the electrode. The current is applied in the form of machining pulses having a given amplitude and duration. In the intervals between the machining pulses the electrolyte is renewed. During the application of the machining pulses the electrode and the workpiece are moved towards one another with a given feed rate, as a result of which the electrode forms a cavity or eventually a hole in the surface of the workpiece, the shape of this cavity or hole corresponding to the shape of the electrode. This process can be used, for example, for making intricate cavities or holes in or for shaping hard metals or alloys.

The copying precision with which the shape of the cavity or the hole in the workpiece follows the shape of the electrode is important for the quality of the result. Meanwhile, many publications in the form of articles in periodicals and patent documents have appeared in which proposals have been made to improve the copying precision of electrochemical machining.

SUMMARY OF THE INVENTION

Therefore, it is an object of the present invention to provide an electrochemical machining method and arrangement with a good copying precision. To this end, the method of the type defined in the opening paragraph is characterized in that the machining pulses alternate with electrical passivation pulses of the same polarity as the machining pulses, the voltage of the passivation pulses having an amplitude which is inadequate to dissolve the workpiece and a passivation film on the workpiece.

In the intervals between the machining pulses, during renewal of the electrolyte, passivation pulses are applied deliberately with such an amplitude that a passivation layer of metal oxides is formed around the electrode on the workpiece. During the next machining pulse this layer is removed selectively at the end face of the electrode. In this way the machining pulse is given a higher effectiveness in the feed direction. This improves the copying precision because comparatively more material of the workpiece is dissolved at the end face of the electrode and in the cavity to be machined in the workpiece smaller radii are formed at the edges and slopes of the lateral surface of the cavity. Additional advantages to be mentioned are that the energy consumption of the process is smaller and that the dissolution rate of the workpiece in the feed direction is higher. This is because, owing to the local passivation layers, the energy of the machining pulses is no longer used for the undesired removal of material from the lateral surfaces of the cavity in the workpiece.

Preferably, a distance between the workpiece and the electrode is maintained, which is smaller during the machining pulses than during the passivation pulses. By increasing the distance between the workpiece and the electrode during the passivation pulses it is achieved that owing to the greater distance the electric field of the passivation pulses has less effect at the end face of the electrode than at the lateral walls of the cavity in the workpiece. Thus, it is achieved with greater accuracy that opposite the end face of the electrode, i.e. at the bottom of the cavity in the workpiece, a thinner passivation layer, or even no passivation layer at all, is formed than elsewhere in the cavity to be machined. The amplitude, duration and waveform of the machining pulses are selected in such a manner that activation of the surface to be machined occurs only in the case of the smaller distance during the machining pulses. In that case anode dissolution during the application of machining pulses occurs only at those locations of the workpiece where the gap is smaller than the critical distance. The remainder of the workpiece is protected by a passivation layer and is not dissolved. This results in a very high copying precision. In a variant of the method in accordance with the invention, the workpiece and the electrode perform an oscillating movement relative to one another, the distance between the workpiece and the electrode reaching a minimum during the machining pulses.

The amplitude of the voltage of the passivation pulses plays an important part. Too low a voltage has no or little effect because the passivation layers are too thin. Conversely, too high a voltage causes the previously formed passivation layers to disappear at the lateral surfaces of the cavity and causes the copying precision to deteriorate. An even higher voltage will ultimately yield the same effect as the normal machining pulses and will cause the workpiece to dissolve at various undesired locations in the cavity to be machined. To optimize the amplitude of the passivation pulses a variant of the method in accordance with the invention is characterized in that the amplitude of the voltage of the passivation pulses is adjusted at least once during electrochemical machining, the amplitude of the passivation pulses in a series of successive passivation pulses being changed until the resistance value measured between the workpiece and the electrode has reached a maximum, after which electrochemical machining is continued with an amplitude of the passivation pulse which corresponds to the maximum of the resistance value.

During a series of successive passivation pulses the amplitude of the voltage of the passivation pulses is changed gradually, for example, increased from zero to a given maximum value at which the workpiece begins to dissolve. In each subsequent passivation pulse a slightly higher voltage is applied and the resistance of the gap is measured and stored. From the measured resistance values the highest value is chosen and the corresponding amplitude of the voltage is fixed and sustained for some time during the subsequent machining of the workpiece. The amplitude of the voltage of the passivation pulses is thus optimized for a maximal gap resistance. This implies that the formation of passivation layers on the lateral surfaces is also maximal and the copying precision is optimum.

For this purpose, the arrangement in accordance with the invention is characterized in that the arrangement comprises:

an electrode;

means for positioning the electrode and the workpiece in a spatial relationship so as to maintain a gap between the electrode and the workpiece;

means for supplying electrolyte into the gap;

a first electric power supply source, which is electrically connectable to the electrode and the workpiece to supply machining pulses to the workpiece and the electrode;

a second electric power supply source of the same polarity as the first power supply source and having an output voltage which is controllable by means of a control signal, which second power supply source is electrically connectable to the electrode and the workpiece to supply passivation pulses to the workpiece and the electrode;

means for alternately connecting the first and the second power supply source to the workpiece and the electrode;

means for generating a varying control signal for changing the output voltage of the second power supply source during successive passivation pulses;

means for measuring, during the successive passivation pulses, the electrical resistance of the gap between the workpiece and the electrode at an instant during the passivation pulses and for storing resistance information values which are representative of the resistance of the gap at said instant and for storing corresponding control signal values of the control signal at said instant; and means for calculating a maximum value from the resistance information values, and means for maintaining the control signal for the second power supply source at the control signal value which corresponds to the maximum value.

The second power supply source is controllable and its voltage is gradually raised, the value of the voltage for which the measured gap resistance is maximal being stored.

When a varying gap distance is used any value of the distance between the workpiece and the electrode will correspond to another optimum amplitude of the voltage of the passivation pulses. This is the case particularly when the workpiece and the electrode perform an oscillating movement relative to one another and the distance between them is, in fact, never constant. In order to preclude this problem, a further variant of the method in accordance with the invention is characterized in that the passivation pulses are divided into time slices and for each individual time slice the instantaneous amplitude of the voltage of the passivation pulses is changed until the resistance value measured between the workpiece and the electrode has reached a maximum during the individual time slice, after which electrochemical machining is continued with passivation pulses whose instantaneous amplitude varies in accordance with the amplitude found for each time slice and corresponding to the maximum of the resistance value in said time slice.

The time span of each of the passivation pulses is divided into a plurality of slices and in each slice the amplitude of the voltage during successive passivation pulses is changed until the maximal resistance in said slice is found. The corresponding optimum slice voltage of the passivation pulse in this slice is stored. Upon termination of this adjustment procedure all the stored optimum slice voltages are generated consecutively in the correct sequence within the time span of the passivation pulses, as a result of which the amplitude of the voltage of the passivation pulse has a waveform which is optimized for the variation in the gap distance.

For this purpose, an embodiment of the arrangement in accordance with the invention is characterized in that the means for generating the varying control signal include means for changing the output voltage of the second power supply source at different instants within the time span of one passivation pulse;

the means for measuring and storing are adapted to store resistance information values which are representative of the instantaneous resistance of the gap at the different instants within the passivation pulse and to store corresponding control signal values of the control signal at the different instants;

means for calculating are adapted to calculate individual maximum values from the resistance information values of corresponding instants within successive passivation pulses and to generate a control signal having an instantaneous value which at the different instants is equal to the control signal values which correspond to the individual maximum values.

The voltage of the second power supply source is thus varied within the time span of a passivation pulse whose waveform matches best with the varying gap size during the passivation pulse.

The aforesaid adjustment procedure of determining and maintaining the optimum amplitude waveform for the voltage of the passivation pulses can be repeated as frequently as is necessary during the further electrochemical machining of the workpiece.

A variant of the method in accordance with the invention is characterized in that in the time intervals between the successive machining pulses, additional electrical pulses of opposite polarity are applied between the workpiece and the electrode, which last-mentioned pulses have a voltage whose amplitude does not exceed the amplitude at which the electrode begins to dissolve in the electrolyte, and/or in the time intervals between the successive machining pulses the passivation pulses alternate with electrical pulses of opposite polarity, which last-mentioned pulses have a voltage whose amplitude does not exceed the amplitude at which the electrode begins to dissolve in the electrolyte.

The process is now supplemented and/or alternates with electric pulses of opposite polarity in the intervals between the machining pulses. The purpose, effect and setting of the amplitude of the voltage of the pulses of opposite polarity are described comprehensively in the International Application WO 97/03781. Said Application describes between what optimum limits the amplitude of the voltage of the pulses of opposite polarity should be adjusted, on the one hand, to prevent the electrode from dissolving and thus reducing the machining accuracy and, on the other hand, to achieve a high machining efficiency in combination with a well-defined surface condition, for example in the form of a certain lustre. When chrome-nickel steel is machined it is found that under these working conditions a reduced concentration of hexavalent toxic chromium is left in the finished electrolyte solution, as a result of which it is easier to comply with requirements as regards environmental pollution.

The resistance of the gap can be calculated by measuring the current through and the voltage across the gap between the electrode and the workpiece and storing the measurement data in a memory. The current and the voltage are preferably measured by means of analog-to-digital converters coupled to a computer in which the measurement data is stored. The computer calculates the maximum gap resistance by analyzing the measurement data. The computer further generates the control signal for controlling the output voltage of the second power supply source. During the adjustment procedure the output voltage of the second power supply source is gradually changed under command of the control signal from the computer. After the computer has found the maximum resistance value the corresponding control signal is continuously generated by the computer during a given time.

These and other aspects of the invention will be described in more detail with reference to the accompanying drawings, in which:

BRIEF DESCRIPTION OF THE DRAWINGS

In these Figures parts having a like function or purpose bear the same reference symbols.

DESCRIPTION OF THE PREFERRED EMBODIMENTS

Figure 1:
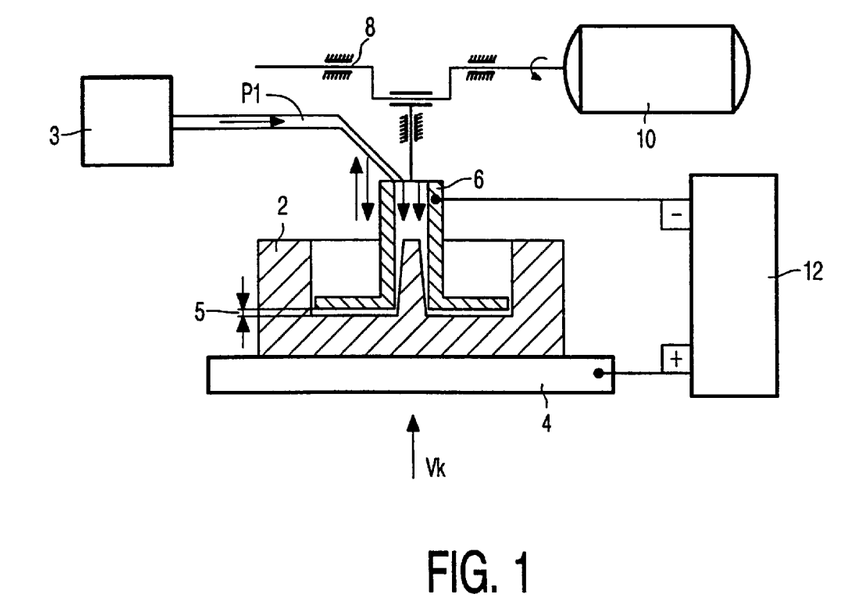
FIG. 1 diagrammatically shows an embodiment of an arrangement for carrying out the method in accordance with the invention.

FIG. 1 shows an arrangement for the electrochemical machining of a workpiece 2. The workpiece 2 is arranged on a table 4 which is moved at a feed rate Vk towards an electrode 6 which performs an oscillating movement with respect to the workpiece 2, which is effected by means of a crankshaft 8 which is driven by a motor 10. The workpiece is made of, for example, a kind of steel containing chromium. An electrolyte, for example, an aqueous solution of nitrates of alkali metals, flows in the gap 5 between the workpiece 2 and the electrode 6 and is circulated at a pressure $P_1$ from a reservoir 3. The workpiece 2, the table 4 and the electrode 6 are electrically conductive. The electrode 6 and the table 4 are connected to an electric power supply source 12 which supplies electric pulses to the electrode 6 and the table 4. The electric pulses include machining pulses having a polarity for which the table 4 and, consequently, the workpiece 2 are positive with respect to the electrode 6, which pulses alternate with passivation pulses having the same polarity but having a voltage and waveform to be described hereinafter. During the machining pulses the metal of the workpiece 2 enters into anode dissolution in the electrolyte. During the passivation pulses the surface of the workpiece 2 is passivated locally.

Figure 2:
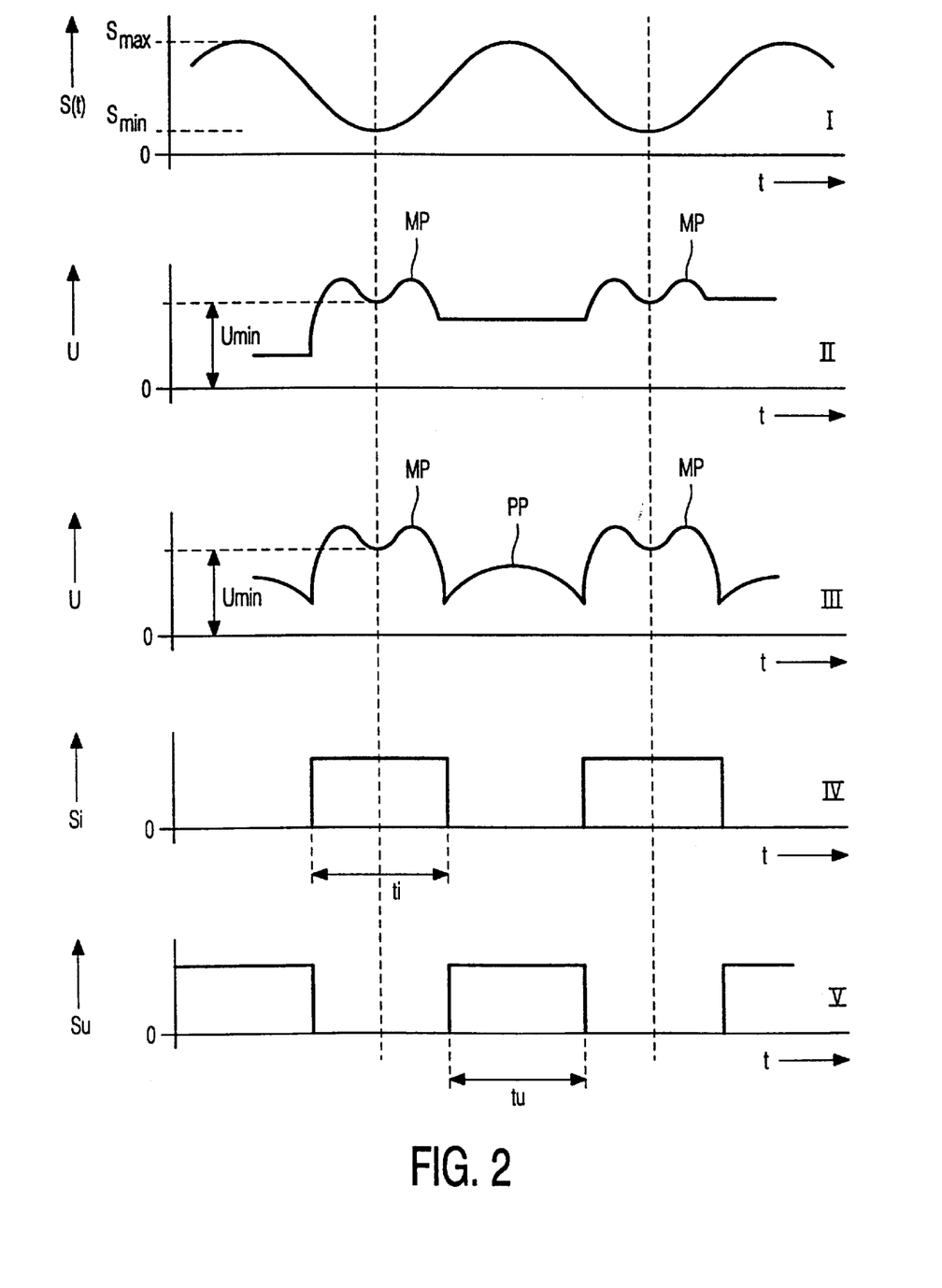
FIG. 2 shows waveforms of signals which appear in a variant of the method in accordance with the invention.

A curve I in FIG. 2 represents the variation of the size S(t) of the gap 5 between the electrode 6 and the workpiece 2. A curve II in FIG. 2 represents the variation of the voltage U across the gap 5 during an adjustment procedure to be described hereinafter, and a curve III represents the voltage variation across the gap 5 during the subsequent machining period. The machining pulses MP are applied in a time interval ti, indicated in the curve IV of FIG. 2, in which the electrode 6 is nearest the workpiece 2. During these machining pulses the voltage across the gap 5 has a waveform with a global minimum, as indicated in the curve II of FIG. 2. The machining pulses alternate with passivation pulses supplied in a time interval tu, indicated in a curve V in FIG. 2. It is to be noted that the shown waveforms of the voltage U across the gap 5 are merely an approximation of the actual voltage waveforms.

Figure 3:
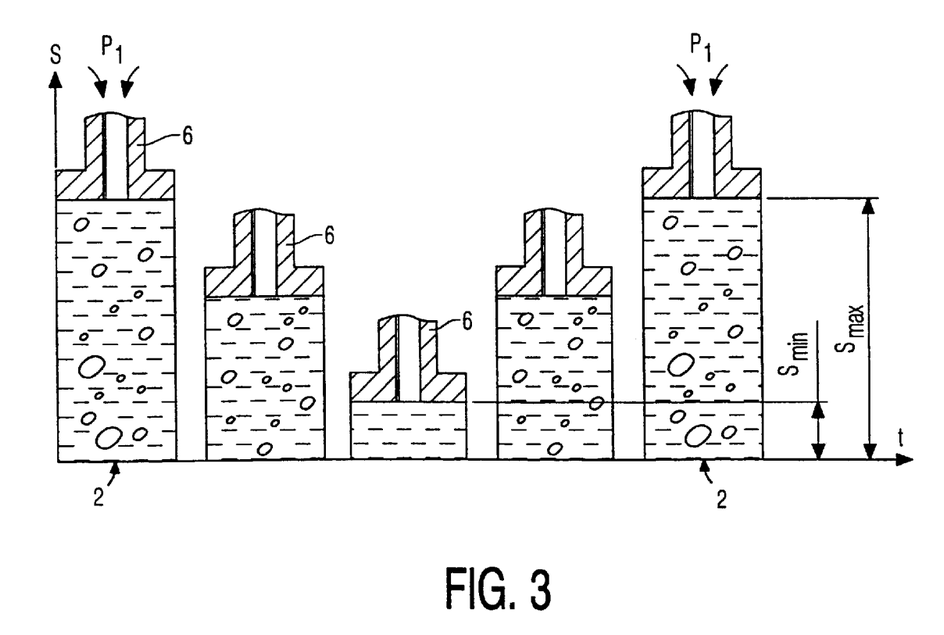
FIG. 3 shows the change in condition of the electrolyte between the electrode and the workpiece when a variant of the method in accordance with the invention is carried out.
Figure 4:
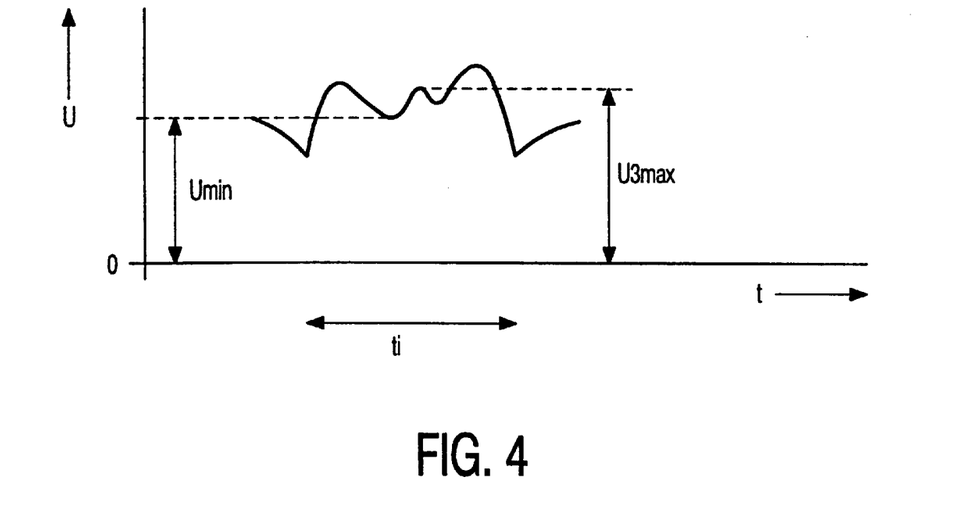
FIG. 4 shows a waveform of a signal which occurs in a variant of the method in accordance with the invention.

FIG. 3 gives an impression of the processes which occur in the gap 5. In the initial stage of the approach of the electrode 6 to the workpiece 2 in the case of a comparatively large gap Smax, the flow of the electrolyte is of a turbulent nature and the electrolyte contains vapor and gas bubbles. In this stage the space between the electrode 6 and the workpiece 2 has a comparatively high electrical resistance, which is apparent from the first maximum in the voltage U in the curve II of FIG. 2. As the electrode 6 approaches, the pressure in the electrolyte increases and the vapor and gas bubbles dissolve, as a result of which the electrolyte is homogeneous and uniform in the gap and a high current density is attainable with a small gap size. As a result of this, the electrical resistance decreases, which is apparent from the occurrence of a global minimum in the voltage U in the curve II of FIG. 2. As a result of the increase of the distance between the electrode 6 and the workpiece 2 and the resumed generation of vapor and gas bubbles, the electrical resistance increases again to a second maximum as shown in the curve II of FIG. 2. The supply of electric power can be so large that the electrolyte begins to boil violently and consequently cavitation is produced in the gap. The cavitation gives rise to a temporary increase in the electrical resistance of the electrolyte, which manifests itself as a local maximum in the voltage variation U between the electrode and the workpiece during the machining pulses. FIG. 4 shows in greater detail the variation of the voltage U with the local maximum U3max which occurs therein after the global minimum Umin.

Figure 5:
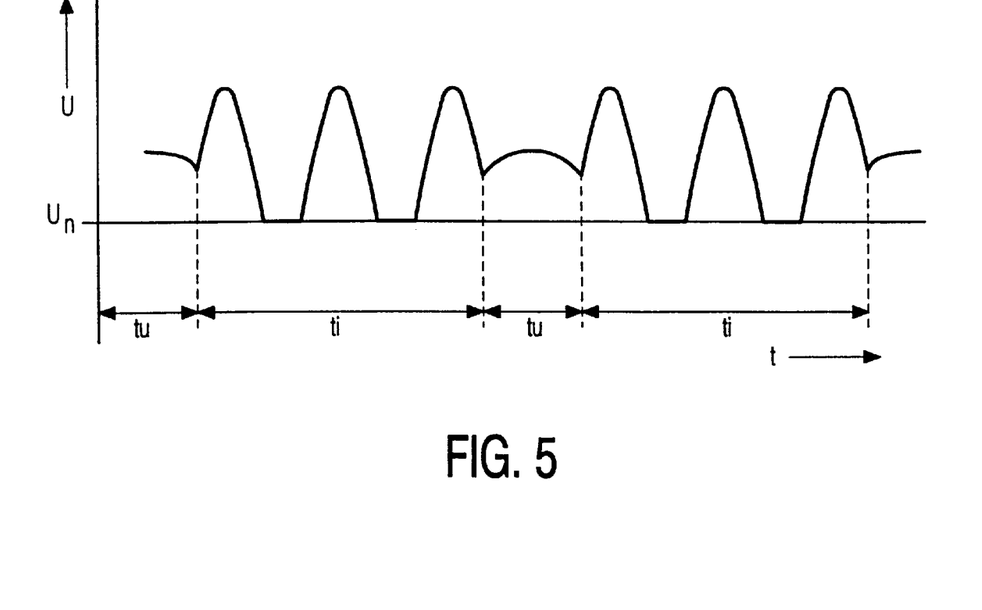
FIG. 5 shows a waveform of an alternative current pulse train for carrying out the method in accordance with the invention.

It is to be noted that such a violent cavitation can be avoided by applying groups of machining pulses, which groups alternate with passivation pulses. Such a pulse train is shown in FIG. 5. Thus, the process proceeds more steadily with a more accurate result using the same minimum gap size.

Figure 6:
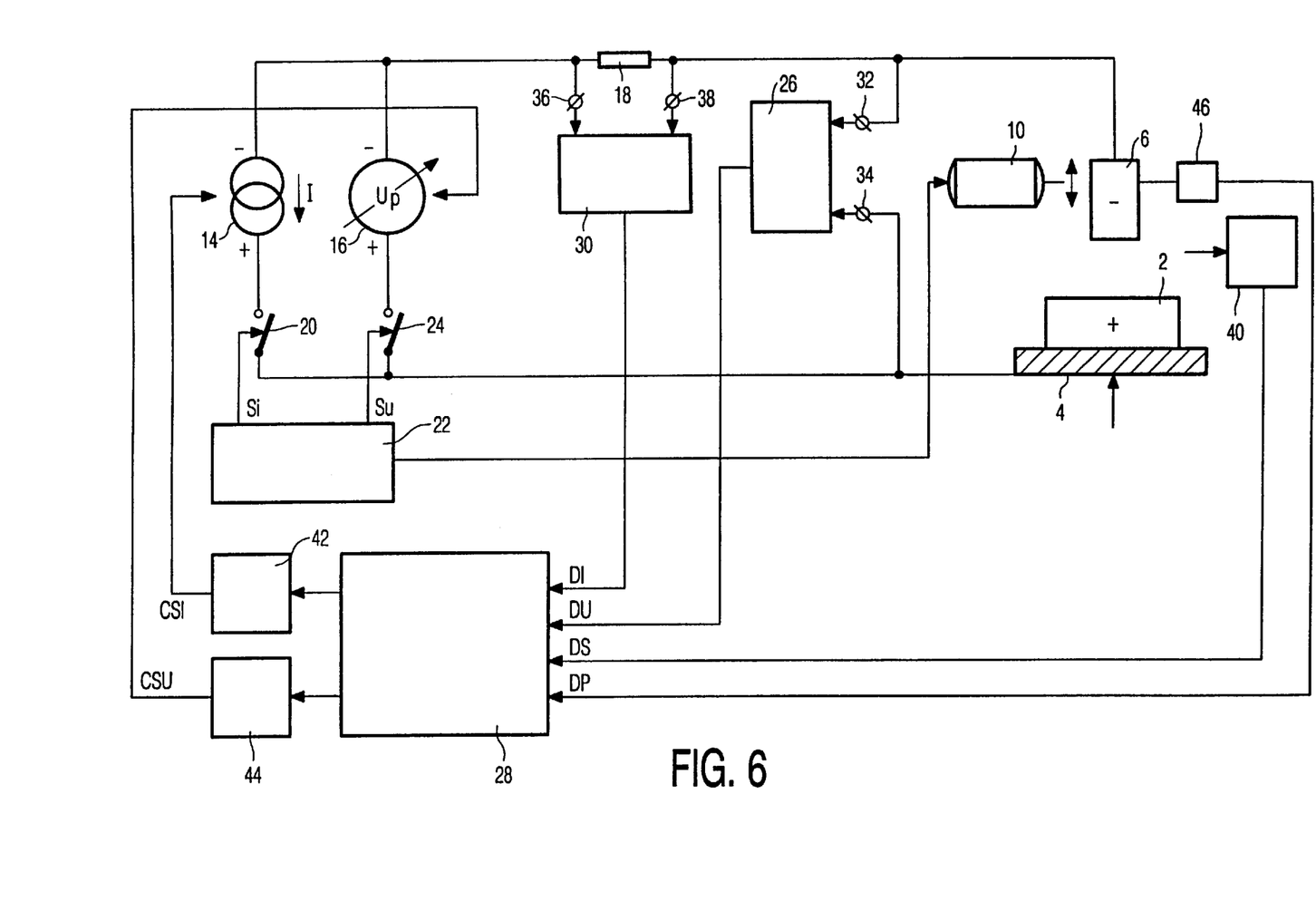
FIG. 6 shows an electrical block diagram of an embodiment of an arrangement for carrying out the method in accordance with the invention.

FIG. 6 shows the electrical block diagram of an electrochemical machining arrangement in accordance with the invention, which includes an electric power supply source 12 in accordance with the invention. The power supply source 12 comprises a current source 14 for supplying the machining pulses, which current source supplies a current I whose magnitude is controllable by means of a control signal CSI, and a controllable voltage source 16 for supplying the passivation pulses, which voltage source supplies an output voltage Up which is controllable by means of a control signal CSU. The negative terminal of the current source 14 and the negative terminal of the controllable voltage source 16 are both connected to the electrode 6 via a series resistor 18. The positive terminal of the current source 14 is connected to the workpiece 2 via a switch 20. The switch 20 is closed at time intervals ti (see FIG. 2) under control of a signal Si, which is supplied by a synchronization unit 22. The positive terminal of the controllable voltage source 16 is connected to the workpiece 2 via a switch 24. The switch 24 is closed at time intervals tu (see FIG. 2) under control of a signal Su, which is also supplied by the synchronization unit 22, which also synchronizes the motor 10. The analog voltage U between the electrode 6 and the workpiece 2 is measured on the terminals 32 and 34 by means of an analog-to-digital converter 26 and is converted into a digital signal DU, which is stored, analyzed and processed in a computer 28. The current I through the gap is measured by measuring the voltage drop across the series resistor 18 on the terminals 36 and 38 by means of a second analog-to-digital converter 30, which converts the analog voltage drop into a digital signal DI, which is processed by the computer 28 similarly to the digital signal DU. Instead of a series resistor 18 a current transformer or any other suitable interface may be chosen. The analog-to-digital converter 30 can be dispensed with if at appropriate instants the input terminals of the analog-to-digital converter 26 are switched over from voltage measurement via the terminals 32 and 34 to current measurement via the terminals 36 and 38. The synchronization unit 22, the analog-to-digital converters 26 and 30, and the computer 28 are supplied with clock pulses (not shown in FIG. 6) which ensure that the data acquisition and the data processing are in synchronism with the appearance of the alternating machining and passivation pulses and the oscillation of the electrode. The position of the table 4 is monitored by means of a position sensor 40, which supplies a signal DS which is a measure of the displacement of the table 4. The computer 28 generates the control signal CSI for the current source 14 and the control signal CSU for the controllable voltage source 16 via suitable interfaces 42 and 44, which can be constructed, for example, as digital-to-analog converters. The angle of rotation of the crankshaft 8 is measured by means of a sensor 46, which supplies a signal DP to the computer 28, which signal is a measure of the relative distance between the electrode 6 and the workpiece 2.

By controlling the feed rate Vk of the table 4 the gap 5 can be adjusted in such a manner that a local maximum U3max occurs as shown in FIG. 4. This local maximum can be detected by analyzing the voltage U by means of the analog-to-digital converter 26 and the computer 28 or by means of an oscilloscope. However, if desired, any other operating point for the size of the gap 5 can be chosen, i.e. also one for which no local maximum U3max occurs in the voltage U.

Figure 7:
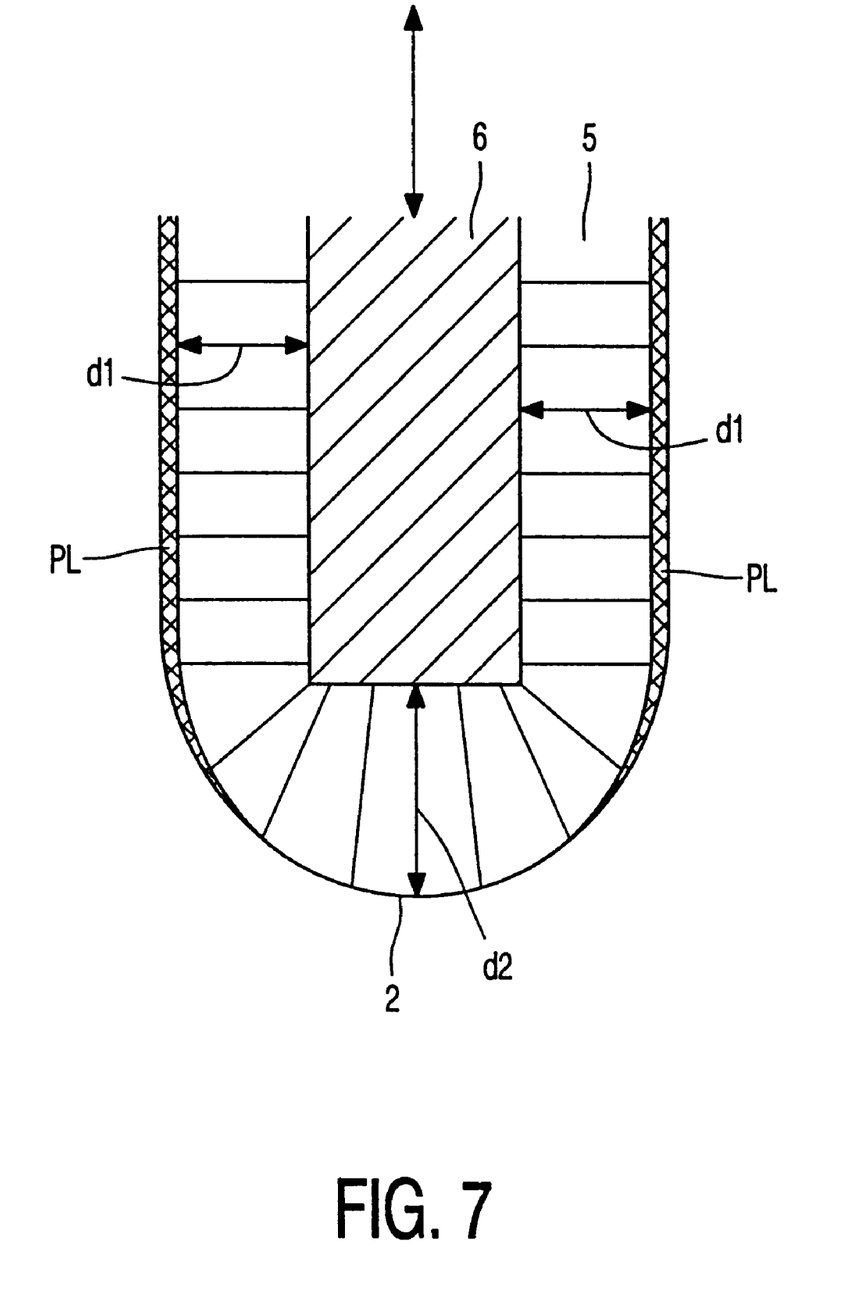
FIG. 7 illustrates the formation of passivation layers in the machining cavity of the workpiece when a variant of the method in accordance with the invention is carried out.

FIG. 7 illustrates the effect of the passivation pulses. The amplitude of the voltage Up of the controllable voltage source 16 is selected so as to form passivation layers PL in the machining cavity in the workpiece 2. However, the amplitude of the voltage Up is not so high that the workpiece dissolves and is neither so high that the passivation layers dissolve again. Owing to the oscillating movement the distance d2 between the end face of the electrode 6 during the machining pulses is smaller than the distance d1 between the lateral wall of the machining cavity and the electrode 6. In the case of a correct choice of the amplitude and duration of the machining pulses it is achieved that the workpiece 2 dissolves only frontally, i.e. opposite to the end face of the electrode 6 in the feed direction, and not at the location of the passivation layers PL. This results in a very good copying precision, the shape of the cavity in the workpiece 2 following the shape of the electrode 6 very accurately. Intricate profiles and punched slopes with a precision of 10 minutes of arc are attainable. The locally deposited passivation layers PL provide not only a higher machining precision but also a better energy efficiency and a higher machining speed. This is because no energy is wasted for the undesired removal of material from the lateral walls of the machining cavity.

For an optimum effect it is therefore desirable if the voltage Up of the passivation pulses has an amplitude which is not so large that the passivation layers PL or even the workpiece 2 dissolve and which is neither so small that not enough or hardly any passivation layers are formed. In both cases the machining pulses will dissolve the workpiece 2 wherever possible and will produce a relatively larger machining cavity in all directions and thereby reduce the copying precision. The optimum amplitude of the passivation pulses is that amplitude for which the resistance of the gap 5 is highest. This is because then the growth of the passivation layers PL, which have a poor electrical conduction, is maximal and the copying precision is also maximal.

In order to achieve an optimum adjustment of the amplitude of the voltage of the passivation pulses, the electrochemical machining arrangement (FIG. 6) effects an adjustment procedure in which the voltage Up of the passivation pulses is increased stepwise from zero volts to the voltage Uap, at which the workpiece 2 enters into anode dissolution, during a plurality of successive oscillations of the electrode 6. For this purpose, the computer 28 applies a suitable control signal CSU to the controllable voltage source 16 via the interface 44. After each increase of the voltage Up the resistance of the gap 5 is measured by means of the analog-to-digital converters 26 and 30. The measured resistance value and the corresponding control signal CSU are stored as numerical values in the main memory of the computer 28. From all the resistance values found the computer determines the largest value and the associated amplitude of the voltage Up. The adjustment procedure is now finished and the machining process is continued for a given time TM, using the amplitude of the voltage Up thus found. As a result of the oscillating movement of the electrode 6 the distance between the workpiece 2 and the electrode 6 in the feed direction changes continually during the passivation pulses. Each value of the distance between the workpiece and the electrode corresponds to another optimum amplitude of the voltage of the passivation pulses. In order to allow for this, the time span of the passivation pulse is divided into slices. The optimum amplitude for each time slice is now determined, the resistance of the gap being maximal in this time slice. Upon completion of the adjustment procedure the computer 28 supplies such a series of control signals to the controllable voltage source 16 within the time span of each passivation pulse that the amplitude of the passivation pulse is given a variation which is optimized for the varying gap size. An example of such a varying amplitude of the passivation pulses is given in curve III of FIG. 2. This elaborate adjustment procedure will now be described in more detail with reference to the diagrams of FIG. 8 and a flow chart in FIGS. 9A and 9B.

Figure 8:
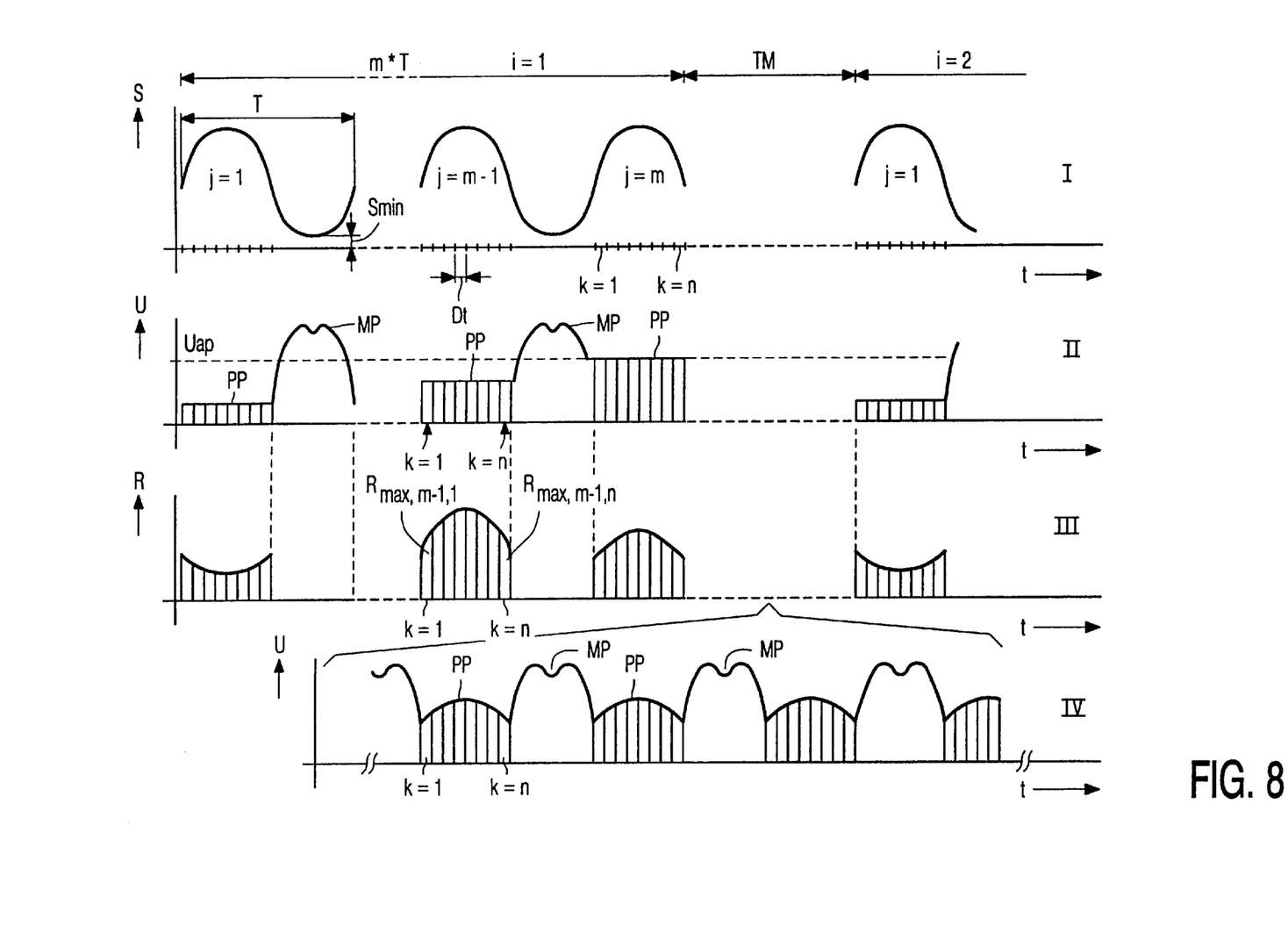
FIG. 8 shows waveforms of the voltage across and the resistance between the electrode and the workpiece when a variant of the method in accordance with the invention is carried out.

FIG. 8, curve I shows the distance S between the workpiece 2 and the electrode 6. The rotation of the crankshaft 8 produces a sinusoidal variation of the distance S, which reaches a minimum Smin during the machining pulses MP. Each revolution of the crankshaft 8 corresponds to an oscillation having a period T. The adjustment procedure covers a group of m oscillations and consequently has a duration mT. The adjustment procedure, i.e. the group of m oscillations, is followed by a machining period TM, in which the workpiece is further machined by means of machining pulses MP and passivation pulses PP having an amplitude variation determined in the preceding adjustment procedure. The length of the machining period TM depends on the operating conditions and can be set according to need. Upon completion of the machining period TM the adjustment procedure, which again covers m oscillations, is repeated. The number of times that the adjustment procedure is repeated also depends on the operating conditions and on the desired result. In the simplest case the adjustment procedure is performed only once and the workpiece is electrochemically machined in one go in the subsequent machining period. Each group has a sequence number i running from 1 to a value determined by the total length of time of the machining process. Each oscillation in the group i has a sequence number j running from 1 to m. Moreover, each oscillation, i.e. also the oscillations in the machining period TM, is divided into time slices of a length Dt. Each slice has a sequence number k running from 1 to n. In FIG. 8 each passivation pulse PP has been divided into 8 slices, i.e. n=8, but obviously a greater or smaller number of slices is also possible. The number of slices required depends on the magnitude and the change in time of the relative movement between the workpiece and the electrode. More slices result in the resolution with which the optimum waveform of the amplitude of the voltage of the passivation pulses is determined being raised and the copying precision being improved.

The curve II in FIG. 8 shows the stepwise increase of the amplitude of the passivation pulses. In oscillation j=1 the first step is applied, starting from zero volts. For all the slices k=1 through k=n the steps are equal. Furthermore, the penultimate oscillation having the sequence number j=m−1 and the last oscillation having the sequence number j=m are shown. In the last oscillation having the sequence number j=m the amplitude of the voltage is equal to the voltage Uap at which the workpiece enters into anode dissolution. Upon expiry of each time slice k (k=1 . . . n) the resistance R of the gap is measured and stored in the memory of the computer. Moreover, the corresponding value of the control signal CSU is stored as a numerical value. These n resistance measurements are repeated for each oscillation j (j=1 . . . m) and the result is illustrated in the curve III, in which the resistance values for the individual slices are shown. For each slice the maximum resistance Rmax in the series of m measurements is determined. It has been assumed, by way of example, that the resistance values per slice measured in the penultimate oscillation having the sequence number j=m−1 are also the maximum resistance values Rmax(j=m−1, k=1) through Rmax(j=m−1, k=n) for each slice. However, this is not necessary. The maximum gap resistance for each individual slice k can be found in oscillations having a different sequence number j. The computer knows the value of the corresponding control signal CSU for each value found for the maximum resistance Rmax. After completion of the adjustment procedure, i.e. in the machining period TM, the computer 28 generates the corresponding values of the control signal CSU in the correct sequence within the time span of each passivation pulse. The curve IV in FIG. 8 gives an example of the variation of the voltage U across the gap in the machining period TM.

Figure 9A:
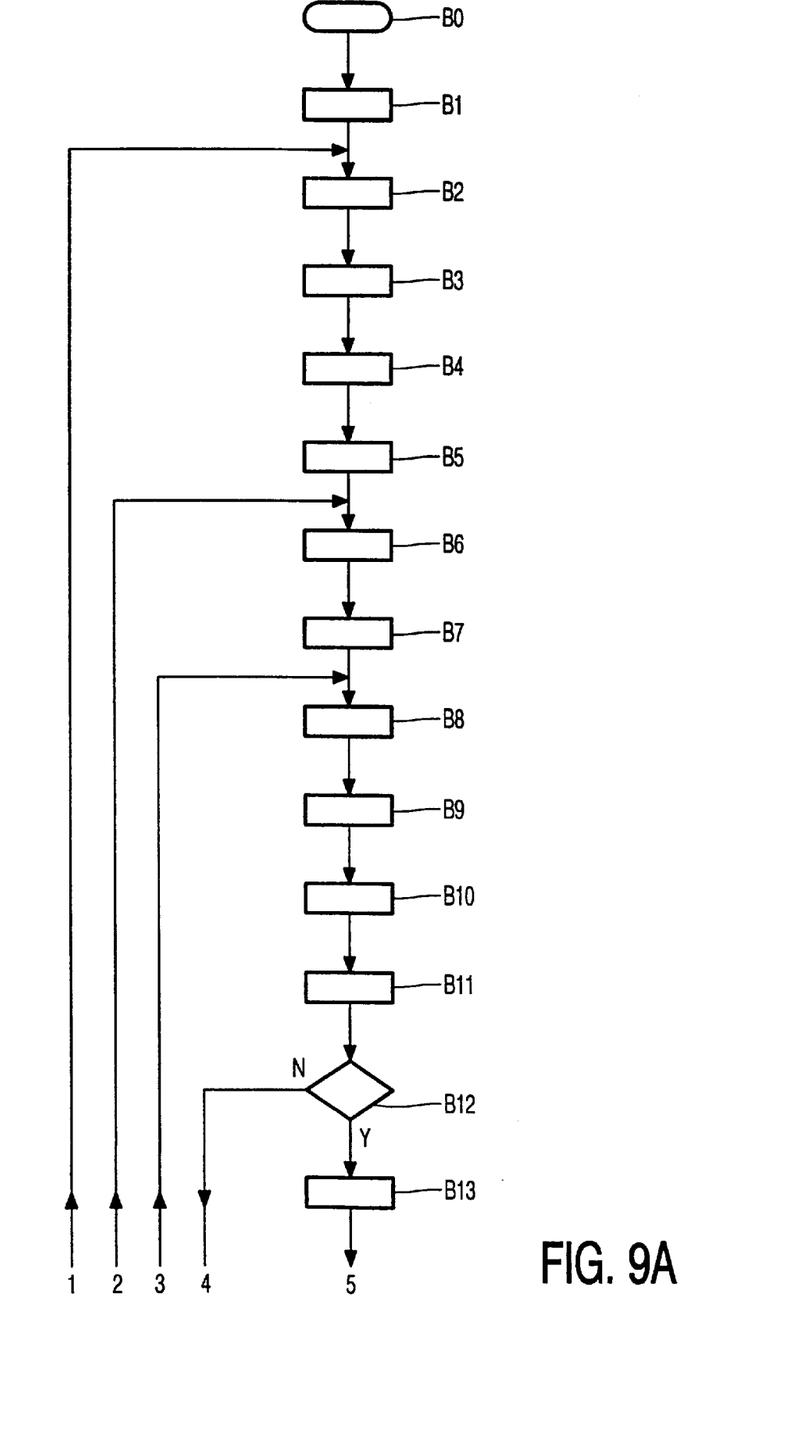
FIG. 9A and FIG. 9B are flow charts of process steps of a variant of the method in accordance with the invention.
Figure 9B:
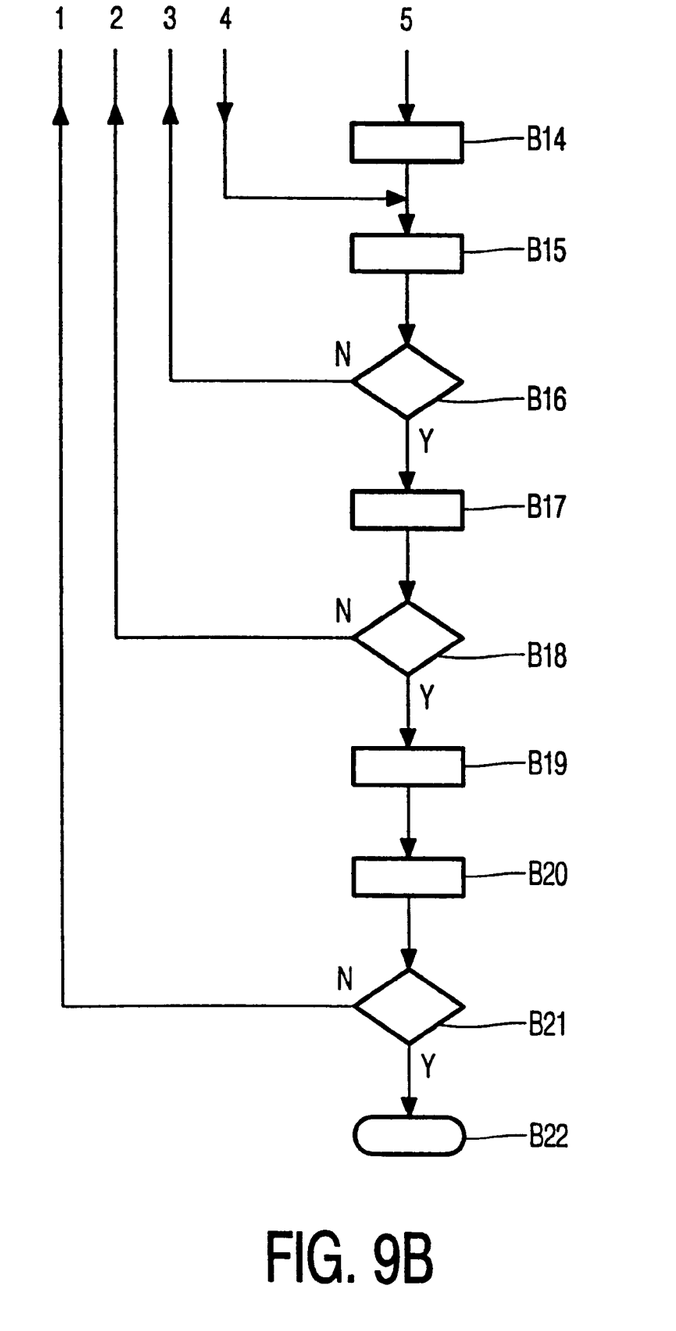

The machining process and the adjustment procedure proceed as shown in the flow charts of FIGS. 9A and 9B. The blocks in these Figures have the following. inscriptions:

B0: begin
B1: i=1
B2: $U^*_k=0$, k=1 . . . n
B3: $R^*_k=0$, k=1 . . . n
B4: $U_{k11}=0$, k=1 . . . n
B5: j=1
B6: check DP
  switch 20 ON; switch 22 OFF
  generate machining pulse
B7: k=1
B8: $U_{kji}=(U_{kji}+dU)<U\text{ap}$
  switch 20 OFF; switch 22 ON
B9: wait Dt
B10: measure $I_{kji}$
B11: $R_{kji}=U_{kji}/I_{kji}$
B12: $R_{kji}>R^*_k$?
B13: $R^*_k=R_{kji}$
B14: $U^*_k=U_{kji}$
B15: k=k+1
B16: k>n?
B17: j=j+1
B18: j>m?
B19: ECM ($U^*_k$, TM)
B20: i=i+1
B21: stop ECM?
B22: End In the block B1 the sequence number i of the group is set to the starting value 1. In the block B2 all the individual optimum voltages U* for all the slices k are set to the starting value zero. In the block B3 all the individual maximum resistance values R* for all the slices k are set to the starting value zero. In the block B4 the initial values of the passivation pulse amplitudes to be incremented for all the slices k are set to zero. In the block B5 the counter j which keeps score of the number of oscillations which have elapsed is set to the starting value 1.

After this initialization the machining process is started. In the block B6 the signal DP which indicates the electrode position is checked. In the case of the correct position the current source 14 is connected by opening the switch 20 and the controllable voltage source 16 is disconnected by opening the switch 24. Subsequently, a machining pulse is applied. This machining pulse has a given duration, which is also determined by the computer. After the machining pulse has finished the slice counter k is set to the value 1 in the block B7.

In the block B8 the amplitude $U_{kji}$ in the $k^{th}$ slice of the $j^{th}$ oscillation of the $i^{th}$ group of the passivation pulse is incremented by a step value dU. The resulting amplitude should not exceed the voltage Uap. Moreover, the current source 14 is disconnected by opening the switch 20 and the controllable voltage source is connected by closing the switch 24. Subsequently, a waiting time of one slice period Dt is observed in the block B9. After this, in the block B10 the instantaneous value of the current $I_{kji}$ in the $k^{th}$ slice of the $j^{th}$ oscillation of the $i^{th}$ group is measured and stored. In the block B11 the instantaneous resistance value $R_{kji}$ is calculated by dividing the instantaneous voltage $U_{kji}$ by the instantaneous current $I_{kji}$.

In the block B12 it is checked whether the instantaneous resistance value $R_{kji}$ thus found is greater than the individual maximum resistance value $R^*_k$ of the slice. If this is not the case, a jump to the block B15 is performed. If said value is greater, the individual maximum resistance value $R^*_k$ is made equal to the instantaneous resistance value $R_{kji}$, which is effected in the block B13. Moreover, in the block B14 the corresponding individual optimum voltage U* for said slice is made equal to the instantaneous value $U_{kji}$. In the block B15 it is examined whether the slice count k is greater than n. If this is not the case, all the slices have not yet been traversed and the program returns to the block B8, the voltage for the next slice is incremented by one step, the current is measured, the resistance is calculated and the maximum resistance value with the associated instantaneous voltage value are stored. This continues until all the slices have been traversed.

Once all the slices have been completed the oscillation count j is incremented by one in the block B17 and is compared with the value m in the block B18. If the number of oscillations which have lapsed is smaller than or equal to m the program returns to the block B6 and a following machining pulse is applied and in the subsequent passivation pulse the voltage is incremented by one step. This continues for m oscillations. Subsequently, in the block B20 the electrochemical machining process is continued with the individual optimum slice voltages $U^*_k$(k=1 . . . n) during the period TM. After this, in the block B20 the group counter i is incremented by 1. In the block B21 it is decided whether the machining process has lasted long enough. If the machining process is to be continued for a longer time the group counter i should be incremented before the decision to stop is taken. A criterion for stopping the machining process can be, for example, the displacement of the table 4 by means of the signal DS of the position sensor 40 or the elapsed process time. If the machining process is not yet completed a return to the block B2 follows and a new adjustment procedure is started, followed by another machining period TM. When the final value is reached the machining process is terminated in the block B22.

The method and arrangement described above were used for machining a test sample. The material of the sample and of the electrode was steel 40×13 in an annealed condition, the machining area was 2 cm$^2$ and the electrolyte was 8% NaNO$_3$. In the machining process the voltage of the machining pulses was 7 V, the duration of the machining pulses was 2 ms, the pressure of the electrolyte near the inlet to the gap was 350 kPa, the temperature of the electrolyte was 18° C., the frequency of the oscillations of the electrode was 47 Hz, the amplitude of the oscillations was 0.2 mm. The voltage of the passivation pulses was +2.8 V in the case of a minimal gap and +3.8 V in the case of a maximal gap +3.8 V.

An analysis of the machining results has shown that as compared with conventional machining methods the use of the electrochemical machining method in accordance with the invention provided an increase in machining productivity by a factor of 1.25 and a reduction of the power consumption by a factor of 1.2. The copying error of the electrode to the surface to be machined was not more than 0.01 mm.

If desired, the passivation pulses shown in the curve III of FIG. 2 and in the curve IV of FIG. 8 may be supplemented and/or may alternate with electric pulses of opposite polarity. The purpose, effect and setting of the amplitude of the voltage of the pulses of opposite polarity are described comprehensively in the International Application WO 97/03781. Said Application describes between what optimum limits the amplitude of the voltage of the pulses of opposite polarity should be adjusted, on the one hand, to prevent that the electrode dissolves and thus reduces the machining accuracy and, on the other hand, to achieve, a high machining efficiency in combination with a well-defined surface condition, for example in the form of a certain lustre. In many respects the arrangement described in said International Application is similar to the arrangement shown in FIGS. 1 and 6. However, for the generation of voltage pulses of opposite polarity in the intervals between the machining pulses the polarity of the controllable voltage source 16 (FIG. 6) should be reversed temporarily, or an additional controllable voltage source of opposite polarity should be provided as well as an additional switch comparable to the switch 24.

Figure 10:
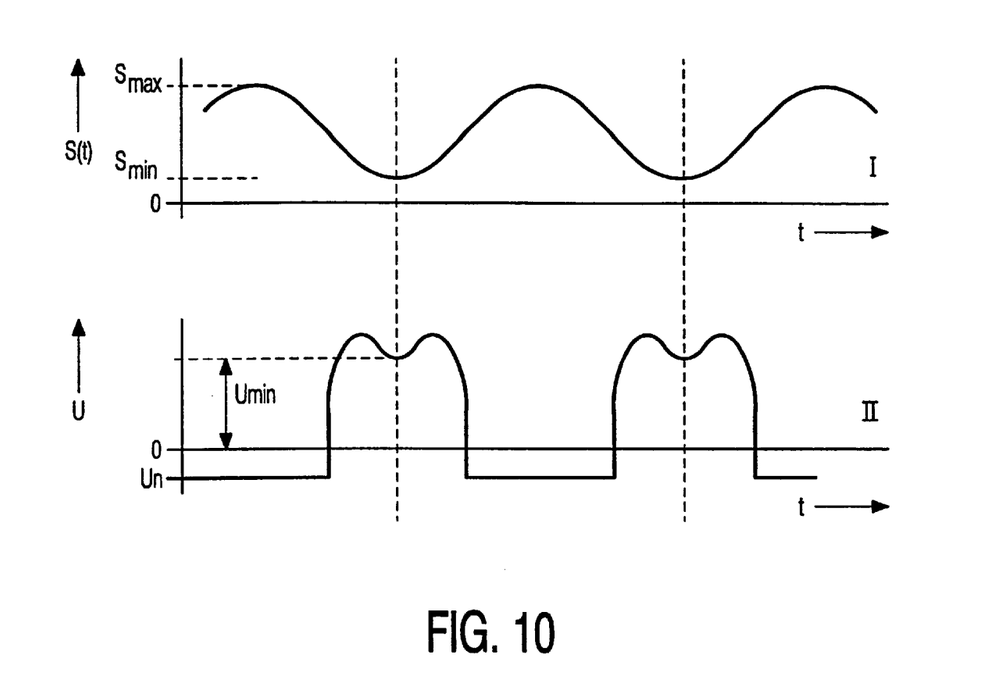
FIG. 10 shows waveforms of additional signals which occur in a variant of the method in accordance with the invention.

The curve II in FIG. 10 illustrates how the machining pulses alternate with negative voltage pulses. Instead of the positive passivation pulses negative pulses are now applied, which give the workpiece a high lustre. The negative voltage pulses can be applied before, during or after completion of the machining method described hereinbefore.

Figure 11:
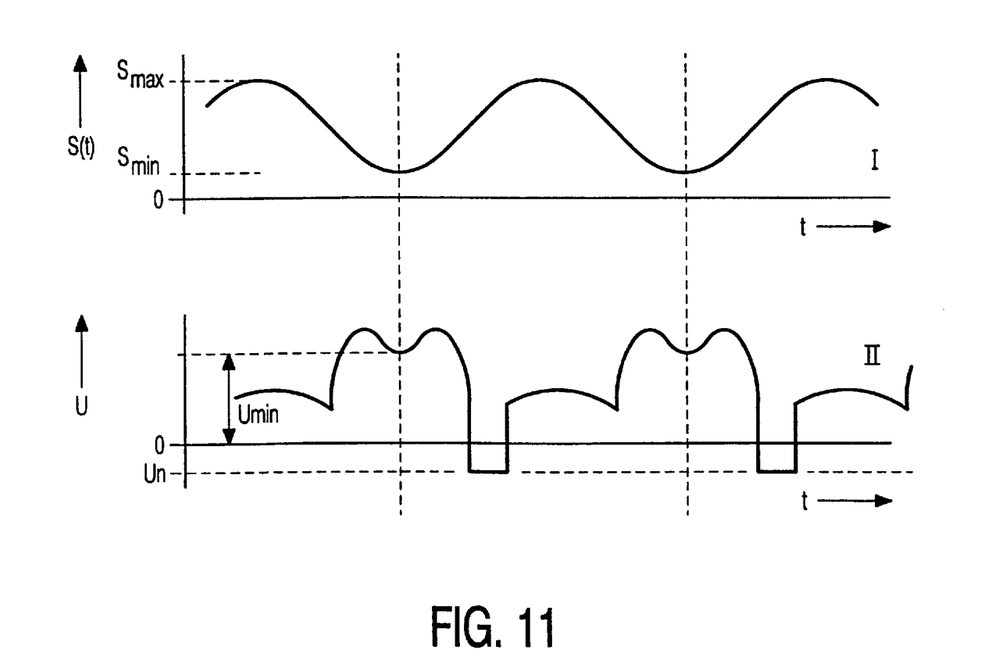
FIG. 11 shows waveforms of additional signals which occur in another variant of the method in accordance with the invention.

FIG. 11 shows an alternative in which in the intervals between the machining pulses first a negative voltage pulse is applied and subsequently a positive passivation pulse whose waveform and amplitude are determined in accordance with the adjustment procedure described hereinbefore.

So far, it has been assumed that the electrode and the workpiece perform an oscillating movement with respect to one another, a machining pulse being applied during the smallest distance between the workpiece and the electrode. Increasing the distance promotes the ease with which the electrolyte can be renewed. However, strictly speaking, such a change of the distance is not necessary if the operating conditions and the desired result permit this.

Instead of a revolving crankshaft it is possible to use other drive mechanisms in order to generate an oscillating or other movement for changing the distance between the electrode 6 and the workpiece 2. For this purpose, an electrically or hydraulically driven construction with a pinion and toothed rack can be used, or an electrically or hydraulically driven lead screw. The electrode 6 can then be made to abut with the workpiece 2, after which the gap size is adjusted. During the machining process the gap size is adapted so as to achieve an on average substantially constant feed rate which is substantially equal to the rate of dissolution of the workpiece 2.

What is claimed is:

1. A method of electrochemically machining an electrically conductive workpiece which comprises applying electrical machining pulses between the workpiece and an electrically conductive electrode while supplying electrolyte between the workpiece and the electrode wherein, the machining pulses alternate with electrical passivation pulses of the same polarity as the machining pulses, the voltage of the passivation pulses having an amplitude which is inadequate to dissolve the workpiece and a passivation film on the workpiece.

2. A method as claimed in claim 1, which further comprises: adjusting the amplitude of the voltage of the passivation pulses at least once during electrochemical machining, by changing the amplitude of the passivation pulses in a series of successive passivation pulses until a resistance value measured between the workpiece and the electrode has reached a maximum, and after measuring the resistance value continuing electrochemical machining with an amplitude of the passivation pulse which corresponds to the maximum of the resistance value.

3. A method as claimed in claim 2, which further comprises: dividing the passivation pulses into time slices and for each individual time slice, changing the instantaneous amplitude of the voltage of the passivation pulses until the resistance value measured between the workpiece and the electrode has reached a maximum during the individual time slice, thereafter, continuing electrochemical machining with passivation pulses whose instantaneous amplitude varies in accordance with the amplitude found for each time slice and corresponding to the maximum of the resistance value in said time slice.

4. A method as claimed in claim 1, which further comprises: keeping a space between the workpiece and the electrode which is smaller during the machining pulses than during the passivation pulses.

5. A method as claimed in claim 4, which further comprises: oscillating the workpiece and the electrode relative to one another so that the space between the workpiece and the electrode reaches a minimum during the machining pulses.

6. A method as claimed in claim 1, which further comprises: in time intervals between the successive machining pulses, applying electrical pulses of opposite polarity between the workpiece and the electrode, wherein said opposite polarity electrical pulses have a voltage amplitude that does not exceed the amplitude at which the electrode begins to dissolve in the electrolyte.

7. A method as claimed in claim 1, which further comprises: in time intervals between the successive machining pulses, alternating the passivation pulses with electrical pulses of opposite polarity, wherein said opposite polarity electrical pulses have a voltage amplitude that does not exceed the amplitude at which the electrode begins to dissolve in the electrolyte.

8. An arrangement for electrochemically machining an electrically conductive workpiece by applying electrical machining pulses between the workpiece and an electrically conductive electrode while electrolyte is supplied between the workpiece and the electrode wherein the arrangement comprises:

an electrode;

means for positioning the electrode and the workpiece in a spatial relationship so as to maintain a gap between the electrode and the workpiece;

means for supplying electrolyte into the gap;

a first electric power supply source, which is electrically connectable to the electrode and the workpiece to supply machining pulses to the workpiece and the electrode;

a second electric power supply source of the same polarity as the first power supply source and having an output voltage which is controllable by means of a control signal, which second power supply source is electrically connectable to the electrode and the workpiece to supply passivation pulses to the workpiece and the electrode;

means for alternately connecting the first and the second power supply source to the workpiece and the electrode;

means for generating a varying control signal for changing the output voltage of the second power supply source during successive passivation pulses;

means for measuring during the successive passivation pulses the electrical resistance of the gap between the workpiece and the electrode at an instant during the passivation pulses and for storing resistance information values which are representative of the resistance of the gap at said instant and for storing corresponding control signal values of the control signal at said instant; and means for calculating a maximum value from the resistance information values, and means for maintaining the control signal for the second power supply source at the control signal value which corresponds to the maximum value.

9. An arrangement as claimed in claim 8, wherein the means for generating the varying control signal include means for changing the output voltage of the second power supply source at different instants within the time span of one passivation pulse;

the means for measuring and storing are adapted to store resistance information values which are representative of the instantaneous resistance of the gap at the different instants within the passivation pulse and to store corresponding control signal values of the control signal at the different instants; and the means for calculating are adapted to calculate individual maximum values from the resistance information values of corresponding instants within successive passivation pulses and to generate a control signal having an instantaneous value which, at the different instants, is equal to the control signal values which correspond to the individual maximum values.

10. An arrangement as claimed in claim 9, wherein the arrangement further comprises means for changing the distance between the electrode and the workpiece so that said distance is smaller during the supply of the machining pulses than during the supply of the passivation pulses.

11. An arrangement as claimed in claim 10, wherein the arrangement further comprises; means for producing an oscillating movement between the workpiece and the electrode, and means for synchronizing the means for alternately connecting the first and the second power supply source with the oscillating movement between the workpiece and the electrode.

12. An electrical power supply source for use in a method of electrochemically machining an electrically conductive workpiece by applying electrical machining pulses between the workpiece and an electrically conductive electrode while electrolyte is supplied between the workpiece and the electrode wherein the electrical power supply source comprises:

a first electric power supply source, which is electrically connectable to the electrode and the workpiece to supply machining pulses to the workpiece and the electrode;

a second electric power supply source of the same polarity as the first power supply source and having an output voltage which is controllable by means of a control signal, which second power supply source is electrically connectable to the electrode and the workpiece to supply passivation pulses to the workpiece and the electrode;

means for alternately connecting the first and the second power supply source to the workpiece and the electrode;

means for generating a varying control signal for changing the output voltage of the second power supply source during successive passivation pulses;

means for measuring, during the successive passivation pulses, the electrical resistance of the gap between the workpiece and the electrode at an instant during the passivation pulses and for storing resistance information values which are representative of the resistance of the gap at said instant and for storing corresponding control signal values of the control signal at said instant; and means for calculating a maximum value from the resistance information values, and means for maintaining the control signal for the second power supply source at the control signal value which corresponds to the maximum value.

13. An electrical power supply as claimed in claim 12, wherein
the means for generating the varying control signal include means for changing the output voltage of the second power supply source at different instants within the time span of one passivation pulse;
the means for measuring and storing are adapted to store resistance information values which are representative of the instantaneous resistance of the gap at the different instants within the passivation pulse and to store corresponding control signal values of the control signal at the different instants; and
the means for calculating are adapted to calculate individual maximum values from the resistance information values of corresponding instants within successive passivation pulses and to generate a control signal having an instantaneous value which, at the different instants, is equal to the control signal values which correspond to the individual maximum values.

14. An apparatus for electrochemically machining an electrically conductive workpiece in an electrolyte, comprising:
an electrode,
means for positioning the electrode and the workpiece in spaced relationship so as to provide a gap therebetween,
means for supplying electrolyte into the gap between the electrode and the workpiece,
an electric power supply for supplying to said workpiece and electrode in different time intervals electric machining pulses and electric passivation pulses of the same polarity,
means for monitoring a parameter related to the gap between the electrode and the workpiece so as to derive a first control signal, and
means responsive to the first control signal for deriving and supplying to the electric power supply a second control signal for control of the electric passivation pulses.

15. The electrochemical machining apparatus as claimed in claim 14 wherein the monitored parameter is the electric resistance of the gap at an instant during the supply of the electric passivation pulses to said gap.

16. The electrochemical machining apparatus as claimed in claim 15 wherein the means for monitoring the gap resistance derives a second control signal determined by the maximum resistance value of the gap during the supply of electric passivation pulses to said gap, and said second control signal controls the voltage amplitude of the electric passivation pulses.

17. The electrochemical machining apparatus as claimed in claim 15 wherein the second control signal controls the voltage amplitude of the electric passivation pulses to a value which is inadequate to dissolve the workpiece and a passivation film formed on the workpiece.

18. The electrochemical machining apparatus as claimed in claim 15 further comprising means for measuring the gap resistance which includes means for determining the values of the gap voltage and the gap current.

19. The electrochemical machining apparatus as claimed in claim 15 wherein,
said electric power supply comprises a first electric power supply source for supplying the electric machining pulses and a second electric power supply source of the same polarity for supplying the electric passivation pulses, said first power supply source comprising a current source, and
the means for deriving and supplying the second control signal produces a second control signal that adjusts the voltage of the second power supply source so as to optimize the voltage amplitude of the passivation pulses for maximum gap resistance.

20. The electrochemical machining apparatus as claimed in claim 14 further comprising; means for adjusting the space between the electrode and the workpiece such that said space is smaller during the supply of the machining pulses to the gap than it is during the supply of passivation pulses to the gap.

21. The electrochemical machining apparatus as claimed in claim 14 further comprising;
means for moving the electrode and workpiece relative to one another so as to impart an oscillating motion thereto,
wherein said electric power supply comprises a first electric power supply source for supplying the electric machining pulses and a second electric power supply source of the same polarity as the first electric power supply source for supplying the electric passivation pulses,
means for alternately connecting the first and second power supply sources to the electrode and workpiece, and
means for synchronizing the alternately connecting means with the oscillating motion provided by the means for moving.

22. The electrochemical machining apparatus as claimed in claim 14 wherein;
said electric power supply comprises a first electric power supply source for supplying the electric machining pulses and a second electric power supply source of the same polarity as the first electric power supply source for supplying the electric passivation pulses, and
the means for deriving and supplying the second control signal produces a second control signal that varies so as to vary the output voltage of the second power supply source during successive passivation pulses.

23. The electrochemical machining apparatus as claimed in claim 22 wherein the means for deriving and supplying the variable second control signal includes means for changing the output voltage of the second power supply source at different instants within the time span of one passivation pulse.

24. The electrochemical machining apparatus as claimed in claim 14 wherein said electric power supply further comprises means for applying electric pulses of opposite polarity between the electrode and workpiece in time intervals between successive machining pulses.

25. The electrochemical machining apparatus as claimed in claim 24 wherein said electric power supply is adapted to alternately supply the passivation pulses and the electric pulses of opposite polarity to the electrode and workpiece during said time intervals between successive machining pulses.

26. An electrochemical machining apparatus comprising:
an electrode,
means for positioning the electrode and the workpiece in spaced relationship so as to maintain a gap between the electrode and the workpiece,
means for supplying electrolyte into the gap,
a first power supply source for supplying machining pulses to the workpiece and electrode, a second electric power supply source of the same polarity as the first power supply source and having an output voltage controllable by means of a control signal, the second power supply source supplying passivation pulses to the workpiece and electrode, means for alternately connecting the first and second power supply sources to the workpiece and electrode, means for generating a varying control signal for changing the output voltage of the second power supply source during successive passivation pulses, means for measuring during the successive passivation pulses the electrical resistance of the gap between the workpiece and electrode, means for calculating a maximum resistance value of the gap, and means for maintaining a control signal for the second power supply source at a control signal value corresponding to the maximum resistance value.

* * * * *